United States Patent [19]

Okazaki

[11] Patent Number: 5,518,307

[45] Date of Patent: May 21, 1996

[54] ANTI-SKID BRAKE SYSTEM OF A VEHICLE

[75] Inventor: Haruki Okazaki, Hiroshima, Japan

[73] Assignee: Mazda Motor Corporation, Hiroshima, Japan

[21] Appl. No.: 229,507

[22] Filed: Apr. 12, 1994

[30] Foreign Application Priority Data

Apr. 14, 1993 [JP] Japan ................... 5-112116

[51] Int. Cl.⁶ ...................................................... B60T 8/58
[52] U.S. Cl. ........................... 303/159; 303/157; 303/166
[58] Field of Search ................................. 303/91, 95–97, 303/100, 103, 105, 106, 110, 111, 157, 158, 159, 166, DIG. 4; 364/426.02, 426.03

[56] References Cited

U.S. PATENT DOCUMENTS

| | | | |
|---|---|---|---|
| 3,734,572 | 5/1973 | Hickner et al. | 303/110 |
| 4,209,203 | 6/1980 | Brearley | 303/110 |
| 4,824,184 | 4/1989 | Spadafora et al. | 303/100 |
| 5,104,204 | 4/1992 | Naito et al. | 303/110 X |
| 5,116,108 | 5/1992 | Sigl et al. | 303/103 |
| 5,150,952 | 9/1992 | Kuwana et al. | 303/110 X |
| 5,220,506 | 6/1993 | Kuwana et al. | 303/110 X |

FOREIGN PATENT DOCUMENTS 50-32709  10/1975  Japan.

Primary Examiner—Robert J. Oberleitner
Assistant Examiner—Peter M. Poon
Attorney, Agent, or Firm—Keck, Mahin & Cate

[57] ABSTRACT

An anti-skid control system of a vehicle includes a wheel speed sensor for sensing a wheel rotation speed, a hydraulic pressure adjusting device for adjusting a brake pressure of hydraulic fluid of the control system, and an anti-skid brake controller for controlling the hydraulic pressure adjusting device based on the wheel rotation speed detected. The brake pressure is cyclically changed in accordance with a control cycle including at least a pressure reduction phase in which the brake pressure is reduced and a pressure increase phase in which the brake pressure is increased. A brake pressure control device detects the pressure reduction amount based on a wheel operation parameter. A brake pressure reducing action is repeatedly executed in the pressure reduction phase at a predetermined interval. Braking performance can be improved by use of the system of this invention.

16 Claims, 15 Drawing Sheets

FIG.2

FRICTION COEFFICIENT μ TABLE

| | 0 | | | Vg | | | | →LARGE |
|---|---|---|---|---|---|---|---|---|
| 0 | 1.0 | 1.0 | 2.0 | 2.0 | 3.0 | 3.0 | 4.0 | 4.0 | 5.0 |
| ↓ | 1.0 | 1.0 | 2.0 | 2.0 | 3.0 | 4.0 | 4.0 | 5.0 | 5.0 |
| | 1.0 | 1.0 | 2.0 | 3.0 | 3.0 | 4.0 | 4.0 | 5.0 | 5.0 |
| Vw (Km/H) | 1.0 | 1.0 | 2.0 | 3.0 | 4.0 | 4.0 | 5.0 | 5.0 | 5.0 |
| | 1.0 | 1.0 | 2.0 | 3.0 | 4.0 | 5.0 | 5.0 | 5.0 | 5.0 |
| ↓ | 1.0 | 1.0 | 2.0 | 4.0 | 4.0 | 5.0 | 5.0 | 5.0 | 5.0 |
| | 1.0 | 2.0 | 3.0 | 4.0 | 5.0 | 5.0 | 5.0 | 5.0 | 5.0 |
| LARGE | 1.0 | 2.0 | 3.0 | 5.0 | 5.0 | 5.0 | 5.0 | 5.0 | 5.0 |

FIG.6

| Fak | MU | VEHICLE BODY SPEED Vr | RUNNING CONDITION PARAMETER |
|---|---|---|---|
| 1 | | HIGH SPEED ZONE | HM 1 |
| | | MIDDLE SPEED ZONE | HM 2 |
| | | LOW SPEED ZONE | HM 3 |
| 0 | 3 | HIGH SPEED ZONE | HM 1 |
| | | MIDDLE SPEED ZONE | HM 2 |
| | | LOW SPEED ZONE | HM 3 |
| | 2 | HIGH SPEED ZONE | MM 1 |
| | | MIDDLE SPEED ZONE | MM 2 |
| | | LOW SPEED ZONE | MM 3 |
| | 1 | HIGH SPEED ZONE | LM 1 |
| | | MIDDLE SPEED ZONE | LM 2 |
| | | LOW SPEED ZONE | LM 3 |

FIG.7

| RUNNING CONDITION PARAMETER | B12 | Bsg | B35 | Bsz |
|---|---|---|---|---|
| HM 1 | -1.5G | 95 % | 0G | 95 % |
| HM 2 | -1.5G | 90 % | 0G | 90 % |
| HM 3 | -1.5G | 85 % | 0G | 85 % |
| MM 1 | -1.0G | 95 % | 0G | 95 % |
| MM 2 | -1.0G | 90 % | 0G | 90 % |
| MM 3 | -1.0G | 85 % | 0G | 85 % |
| LM 1 | -0.5G | 95 % | 0G | 95 % |
| LM 2 | -0.5G | 90 % | 0G | 90 % |
| LM 3 | -0.5G | 85 % | 0G | 85 % |

FIG.8

| MU | Fak | STEER ANGLE θ | B12 | Bsg | B35 | Bsz |
|---|---|---|---|---|---|---|
| 1, 2 | / | < 90° | B12 | Bsg | B35 | Bsz |
| 1, 2 | / | ≥ 90° | B12 | Bsg+5% | B35 | Bsz+5% |
| 3 | 0 | < 90° | B12 | Bsg | B35 | Bsz |
| 3 | 0 | ≥ 90° | B12 | Bsg+5% | B35 | Bsz+5% |
| 3 | 1 | < 90° | B12-1.0G | Bsg-5% | B35 | Bsz-5% |
| 3 | 1 | ≥ 90° | B12-1.0G | Bsg | B35 | Bsz |

FIG.14

PRESSURE REDUCE LEVEL/AMOUNT TABLE

|  |  | REDUCE START | PRESSURE REDUCE LEVEL ||||| REMARK |
|---|---|---|---|---|---|---|---|
|  |  |  | DL | DM | DS | DVS |  |
| FIRST CYCLE | FIRST REDUCTION | 0 ms | 8 ms | 8 ms | 8 ms | 8 ms | * |
|  | SECOND REDUCTION | 8 ms | 20 ms | 16 ms | 12 ms | 8 ms | ** |
|  | THIRD REDUCTION | 40 ms | 8 ms | 4 ms | 0 ms | 0 ms | *** |
|  | FOURTH REDUCTION | 80 ms | 10 ms | 6 ms | 2 ms | 0 ms | *** |
|  | FIFTH REDUCTION | 120 ms | 20 ms | 16 ms | 8 ms | 4 ms | *** |
| AFTER SECOND CYCLE | FIRST REDUCTION | 0 ms | 20 ms | 16 ms | 12 ms | 8 ms | ** |
|  | SECOND REDUCTION | 40 ms | 8 ms | 4 ms | 0 ms | 0 ms | *** |
|  | THIRD REDUCTION | 80 ms | 10 ms | 6 ms | 2 ms | 0 ms | *** |
|  | FOURTH REDUCTION | 120 ms | 20 ms | 16 ms | 8 ms | 4 ms | *** |

[REMARK] (1) *     +8ms AT HIGH FRICTIONAL COEFFICIENT $\mu$
(2) **    +3ms AT HIGH FRICTIONAL COEFFICIENT $\mu$
(3) ***   +2ms AT LOW FRICTIONAL COEFFICIENT $\mu$

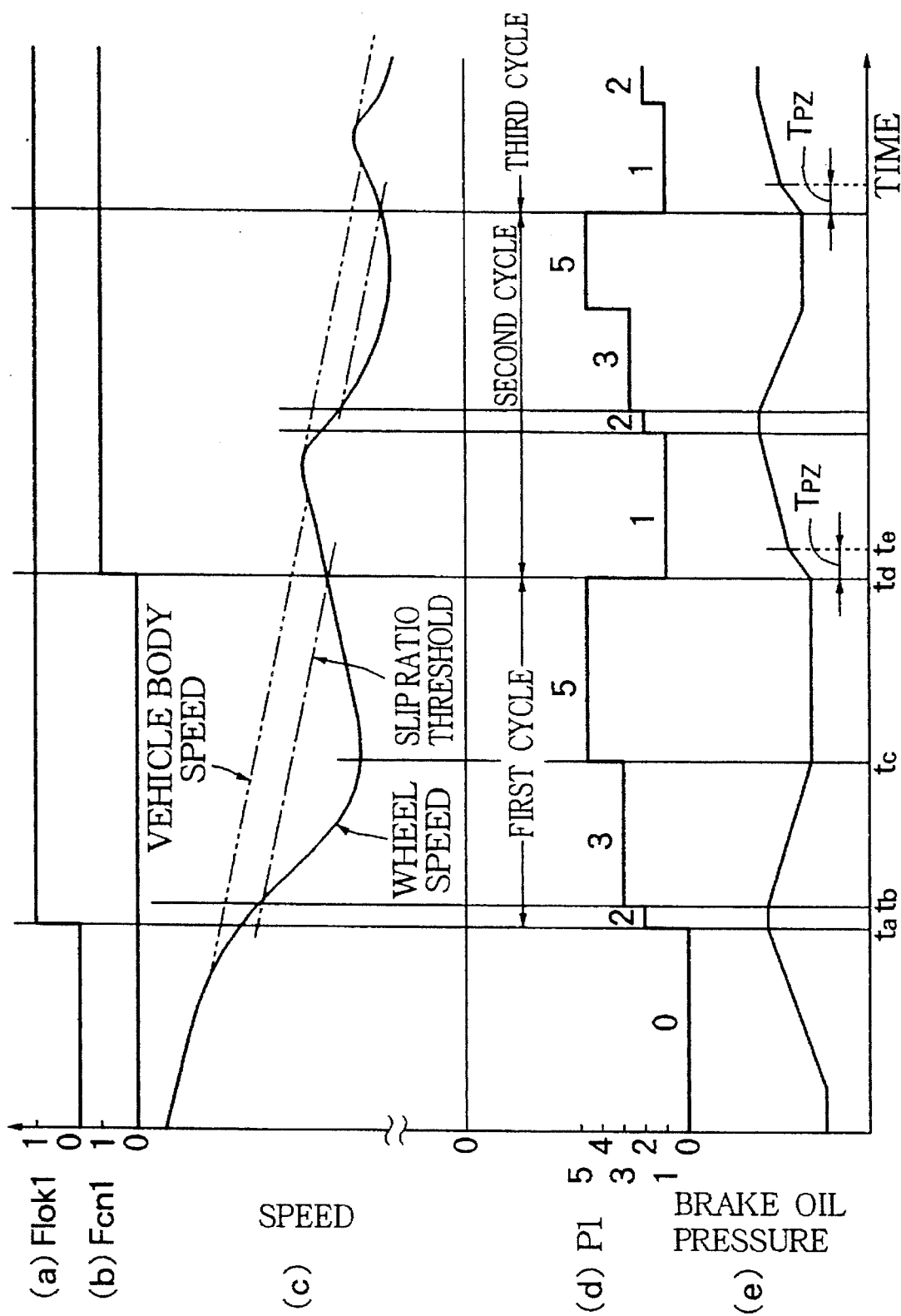

2

ANTI-SKID BRAKE SYSTEM OF A VEHICLE

BACKGROUND OF THE INVENTION

1. Field of the Invention

The present invention relates to an anti-skid brake system of a vehicle which suppresses an excessive braking force acting on vehicle wheels to accomplish an efficient braking action and, in particular, to a pressure reduction control just after an anti-skid brake control (Hereinafter referred to as ABS control) starts.

As a vehicle brake system, there has been known an anti-skid brake system in which a wheel lock or wheel skid is prevented under a braking condition of the vehicle. The anti-skid brake system is provided with wheel speed sensors for sensing rotation speeds of four wheels of the vehicle, respectively, magnetic control valves for controlling a brake oil pressure, controller for controlling the operation of the control valves. The controller calculates an acceleration or deceleration of the wheels based on the wheel speeds detected and reduces a brake pressure of hydraulic fluid in the control system by controlling the magnetic valves when the acceleration or deceleration of the wheel rotation is lower than a predetermined value. The controller also increases the brake pressure by controlling the magnetic valves when the wheel rotation is restored as a result of the brake pressure reduction according to the anti-skid control and when the acceleration or the deceleration is increased beyond a predetermined value. The above anti-skid brake control includes a pressure increase phase, increased pressure hold phase, pressure reduction phase and a reduced pressure hold phase in a control cycle, or may simply include the pressure increase phase and pressure reduction phase in one control cycle. The ABS control is made to cyclically execute the above phases until the vehicle is stopped. The ABS control is advantageous in that the wheel lock or wheel skid can be effectively suppressed even under an abrupt braking action to stop the vehicle with a short braking distance and with stable steering.

Japanese Patent publication 50-32709 discloses a device which reduces the brake pressure when $Vw = <S*V + k*WG$ wherein the wheel speed is $Vw$, the vehicle speed is $V$, the wheel deceleration is $WG$, the slip ratio ($Vw/V$) is $S$, and a predetermined constant is $k$.

Generally, the brake pressure reduction is made in a manner of repeating a plurality of intermittent pressure reduction actions each lasting several milliseconds. The amount of the pressure reduction of each action is determined based on the slip ratio and the wheel deceleration. Thus, the pressure reduction amount in the first control cycle in the ABS control as well as the second or after control cycle is determined based on the slip ratio and the wheel deceleration. It should, however, be noted that the rotation of the wheel is not stable in a condition just after the ABS control is started. Consequently, the wheel speed and/or the wheel deceleration would be changed greatly. Therefore, if the pressure reduction amount is determined based on the wheel speed and the wheel deceleration, the reduction amount would be too much or too small. Particularly, where the frictional coefficient μ of the road is small, the pressure reduction amount tends to be too much to cause wheel lock.

SUMMARY OF THE INVENTION

It is therefore an object of the present invention to set an appropriate pressure reduction amount, specifically in a pressure reduction phase of the first control cycle of the ABS control.

The above and other objects of the invention can be accomplished by an anti-skid control system of a vehicle comprising a wheel speed sensor for sensing a wheel rotation speed, a hydraulic pressure adjusting device for adjusting a brake pressure of a hydraulic fluid, and an anti-skid brake controller for controlling the hydraulic pressure adjusting device based on the wheel rotation speed detected so that the brake pressure is cyclically changed in accordance with a control cycle including at least a pressure reduction phase, in which the brake pressure is reduced, and a pressure increase phase, in which the brake pressure is increased, a brake pressure control device is used for detecting the pressure reduction phase, for determining a brake pressure reduction amount based on a wheel operation parameter and for executing a brake pressure reducing action in the pressure reduction phase repeatedly at a predetermined interval. If the interval of the brake pressure reducing action is determined appropriately, an influence of the response delay of the hydraulic pressure adjusting device can be effectively suppressed, preventing a deterioration of the braking performance and a wheel lock phenomenon. Thus, the brake pressure reducing action can be properly done in response to the slippage of the wheel and/or the wheel acceleration or the deceleration.

Preferably, the interval is longer than a response delay time of the hydraulic pressure adjusting device from a command signal thereto. Thus, the influence of the delay time of the pressure adjusting device can be surely avoided.

In another preferred embodiment, a brake pressure reduction amount in each brake pressure reducing action is increased as the slippage of the wheel and/or the wheel acceleration or deceleration are/is increased. The brake pressure reduction amount is gradually reduced until a predetermined time passes after the brake pressure reduction phase is initiated and is gradually increased after the predetermined time passes. A deep slip condition or a large slippage of wheel can be effectively avoided.

In further preferred embodiment, a friction coefficient detector is provided for detecting a friction coefficient of a road on which the vehicle is running. When the frictional coefficient is greater than a predetermined value, the brake pressure reduction amount in the first brake pressure reducing action is increased. The brake pressure reduction amount may be increased after a predetermined time passes from a first brake pressure reducing action. In a preferred embodiment, a map of the brake pressure reduction amount is provided in connection with a brake pressure reduction level and a brake pressure reducing action timing. Thus, a pressure reduction characteristic can be widely provided.

Preferably, the brake pressure reduction level in the brake pressure reduction phase is greater than a first predetermined value after the predetermined time period passes, a continuous brake pressure reducing action is executed. Likewise, where the brake pressure reduction level is greater than a second predetermined value after a time period which is twice the predetermined time period, the continuous brake pressure reducing action is executed.

In another aspect of the invention, an anti-skid control system of a vehicle comprises a wheel speed sensor for sensing a wheel rotation speed, a hydraulic pressure adjusting device for adjusting a brake pressure of hydraulic fluid in the control system, and an anti-skid brake controller for controlling the hydraulic pressure adjusting device based on the wheel rotation speed detected so that the brake pressure is cyclically changed in accordance with a control cycle including at least a pressure reduction phase in which the brake pressure is reduced and a pressure increase phase in which the brake pressure is increased, wherein a first brake pressure reducing action is executed with a predetermined amount when the pressure reduction phase of a first control cycle starts after the ABS control is initiated and a second brake pressure reducing action is executed following the first brake pressure reducing action with an amount which is calculated based on a slippage of the wheel and/or wheel acceleration or deceleration at the end of the first brake pressure reducing action.

In a preferred embodiment, the brake pressure reduction amount in the second brake pressure reducing action is increased when a frictional coefficient of a road on which the vehicle is running is high or greater than a predetermined value.

According to the present invention, the anti-skid brake controller controls the hydraulic pressure adjusting device based on the wheel rotation speed detected by the wheel speed detector.

The second brake pressure reducing action is executed continuously following the first brake pressure reducing action in the first pressure reduction phase after the anti-skid brake control is initiated. The first brake pressure reducing action is done with a predetermined amount. Thus, this action can be done without being influenced by an initial stage of the wheel speed and the wheel acceleration or deceleration which are generally not stable enough to determine the brake pressure reduction amount of the first brake pressure reducing action based thereon. The amount of the brake pressure reduction in the second brake pressure reducing action is determined based on the slip rate and/or the wheel acceleration or deceleration at the end of the first brake pressure reducing action. Thus, the brake pressure reduction amount of the second brake pressure reducing action is influenced by neither the unstable initial wheel speed nor wheel acceleration. Thus, both the first and second brake pressure reducing action can be done properly as a whole.

As aforementioned, the brake pressure reduction amount is compensated to increase the brake pressure reduction amount of the second brake pressure reducing action when a friction coefficient of the running road is greater than a predetermined value. As the frictional coefficient of the road is increased, the deformation of wheel tire is increased to thereby increase the wear of the wheel tire. According to the present invention, as the frictional coefficient is increased, the brake pressure reduction amount in the second brake pressure reducing action is increased to reduce an undue and excessive deformation of the wheel. As a result, the wear amount of the wheel tire can be reduced to improve the tire durability.

Further objects, features and advantages of the present invention will become apparent from the Detailed Description of Preferred Embodiments which follows when read in light of the accompanying Figures.

BRIEF DESCRIPTION OF THE DRAWINGS

FIG. 2 is a chart of a frictional coefficient of a road;

FIG. 6 is a table for setting a running condition parameter;

FIG. 7 is a table for setting the threshold value;

FIG. 8 is a table for setting a compensation for the threshold value;

FIG. 14 is a table of brake pressure reduction level and amount of the hydraulic fluid in the control system;

FIG. 15 is a time chart of the operation of the anti-skid brake system;

DETAILED DESCRIPTION OF THE PREFERRED EMBODIMENT

Figure 1:
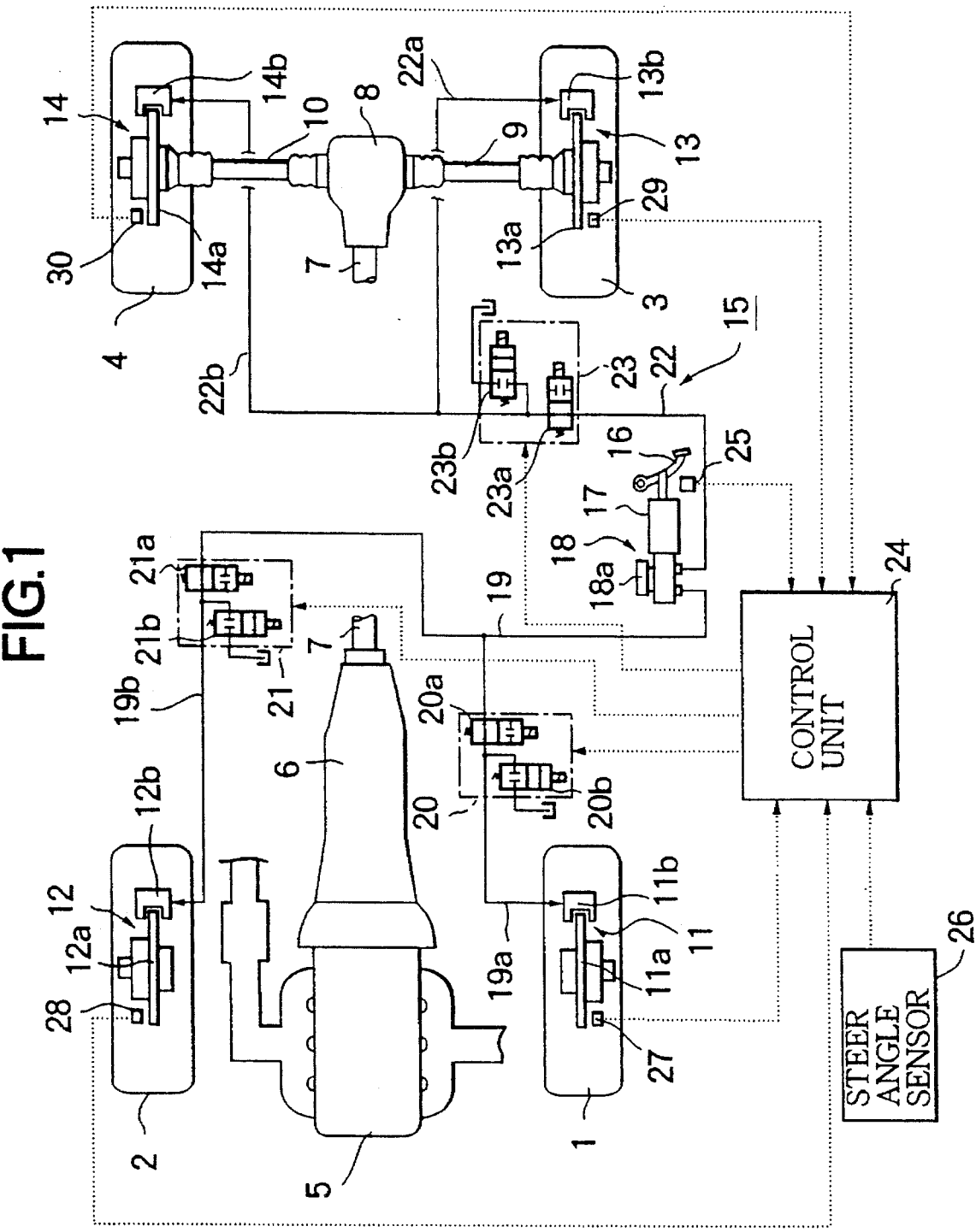
FIG. 1 is a schematic view of an anti-skid brake system of a vehicle in accordance with the present invention.

Referring to FIG. 1, vehicle according to the present invention includes right and left front wheels 1, 2 as driven wheels and a right and left rear wheels 3, 4 as drive wheels. An output torque of an engine 5 is transmitted through an automatic transmission 6, a propeller shaft 7, a differential 8 and right and left axles 9 and 10 to the right and left rear wheels 3, 4. The respective wheels 1–4 are provided with brake devices 11–14 including disks 11a–14a which are integrally rotated with the wheels, calipers 11b– 14b for braking the disks 11a–14a of the wheels and a brake control system 15 for operating the brake devices 11–14.

The brake control system 15 is provided with a booster 17 for multiplying a braking force produced through a driver's stroke of a brake pedal 16, and a master cylinder 18 which produces a braking pressure amplified by the booster 17 in accordance with the braking force. A brake pressure supply line 19 for the front wheels from the master cylinder 18 is divided into two lines. The branch brake pressure lines 19a, 19b are connected with the calipers 11a, 12a of the brake device 11, 12 of the front wheels 1, 2. On one of the pressure lines 19a connected with the brake device 11 of the left wheel 1 is disposed a first valve unit 20 including a magnetic on-off valve 20a and magnetic relief valve 20b. Likewise, on the other of the pressure lines 19b for the right front wheel 2 is disposed a second valve unit 21 including a magnetic on-off valve 21a and magnetic relief valve 21b.

Similarly, on a brake pressure supply line 22 for the rear wheels from the master cylinder 18 is disposed a third valve unit 21 including a magnetic on-off valve 23a and a magnetic relief valve 23b as well as first and second valve units.

The line 22 is divided into two lines 22a and 22b downstream of the third valve unit 23 and the lines 22a and 22b are connected with calipers 13b and 14b of the brake 13 and 14 of the rear wheels 3, 4. The brake system 15 is formed with a first channel for controlling the brake pressure of the brake device 11 of the left front wheel 1 through a first valve unit 21, a second channel for controlling the brake pressure of the brake device 12 of the right front wheel 2 through the second valve unit 22, and a third channel for controlling the braking pressure of the right and left brake devices 13, 14 of the right and left rear wheels 3,4 through the third valve unit 23. The first through third channels are controlled independently. The brake control system 15 is provided with a control unit 24 which receives a brake signal from a brake switch 25 for detecting on-off action of a brake pedal 16, a steering signal from a steering sensor 26 for detecting a steering angle of the steering wheel, wheel speed signals from wheel speed sensors 27–30 for detecting the wheels, respectively, and produces brake pressure signals in response to the input signals to the first to third valve units 20, 21 and 23. Thus, the control unit 24 can make the ABS control for the first through the third channels independently and concurrently.

In this case, the control unit 24 controls the on-off valves 20, 21 and 23 and the relief valves 20b, 21b and 23b of the first and third valve units 20, 21 and 23 based on the wheel speed detected by the wheel speed sensors 27–40 respectively to provide the front and rear wheels 1,2,3 and 4 with a braking force in accordance with the slip condition of the wheels. Brake oil or hydraulic fluid of the control system exhausted through the relief valves 20b, 21b and 23b of the first through the third valve units 20, 21 and 23 is returned to reservoir tank 18a of the master cylinder 17.

In a non-ABS control condition, the control unit 24 produces no pressure control signals so that the relief valves 20b, 21b and 23b of the first through third valve units 20, 21 and 23 are kept closed. In this case, the on-off valves 20a, 21a and 23a are kept open. Thus, the brake pressure produced in the master cylinder 18 in response to the brake pedal stroke is introduced to the brake devices 11 through 14 of the front wheels 1, 2 and rear wheels 3, 4 and thus the braking force in response to the brake pressure or the brake pedal stroke is applied to the front wheels 1, 2 and rear wheels 3, 4.

Hereinafter, the brake control executed by the control unit is explained.

Control unit 24 calculates the wheel deceleration DVw1–DVw4 and wheel acceleration AVw1–AVw4 of the respective wheels based on the wheel rotation speed Vw1–Vw4. In this case, the control unit 24 calculates the difference between the wheel speed obtained through the current executing cycle of the routine and that through the preceding executing cycle of the routine and divides the difference by the sampling period dt (for example, 7 milliseconds) to renew the deceleration or the acceleration of the current cycle.

The control unit 24 further executes a predetermined rough road judgment routine. The control unit 24 counts the amount by which the wheel acceleration or deceleration exceeds a predetermined value in a predetermined time period. If the amount is smaller than the predetermined value, a rough road flag Fak is set at 0. Conversely, if the amount is greater than the predetermined value, the flag Fak is set at 1. The controller 24 selects one wheel speed and wheel acceleration or deceleration of the rear wheels detected as a representation of the rear wheels for controlling the third channel. In this case, the control unit 24 selects a smaller one of the wheel speed of the rear wheels as a representation of the rear wheels taking consideration of a detection error of the sensors 29, 30. Then, the control unit 24 calculates the acceleration or the deceleration based on the wheel speed selected. Further, the control unit 24 calculates a friction coefficient and a hypothetical vehicle body speed Vr at every predetermined short time period for the three channels. The control unit 24 calculates a slip rate for the three channels based on the rear wheel speed obtained through the wheel speed sensors 29, 30 and the front wheel speed obtained through the speed sensors 27, 28 and the hypothetical vehicle body speed Vr. The slip rate S1 in the illustrated embodiment is defined as follows:

slip rate S1=(wheel speed/hypothetical vehicle body speed)*100

Therefore, as deviation of the wheel speed from the vehicle body speed is increased, the slip rate is reduced so that a slip tendency of the wheel is increased.

Then, the control unit 24 sets thresholds for the first through third channels and makes wheel lock judgment proceedings utilizing the thresholds and phase determination proceedings in which control gains for the first through third valve units 20, 21 and 23 are determined, and cascade judgment proceedings.

In the wheel lock judgment proceedings for the left front wheel of the first channel, the control unit 24 stores a value of a continuous flag Fcn1 of the first channel in the current executing cycle of the routine as a value of the preceding executing cycle of the routine. When the vehicle body speed Vr and wheel speed Vw1 is satisfied (for example, Vr<5 km/H, and Vw1<7.0 km/H), the control unit 24 resets the value of the continuous flag Fcn1 and the lock flag Flok1 at 0 respectively. If not, the control unit 24 judges whether or not the lock flag is set at 1. If the lock flag Flok1 is not 1, the control unit 24 sets the flag Flok1 at 1 when a predetermined condition is satisfied (for example, the wheel deceleration Dw1 is smaller than −3G(grav)).

When a phase flag P1 of the first channel is set at 5 which shows that the phase V and when the slip rate S1 is greater than a 5-1 slip rate threshold Bsz in the case where the flag Flok1 is set at 1, the control unit 24 sets the continuous flag Fcn1 at 1. The continuous flag Fcn1=1 means that the ABS control is continued. Similar wheel lock judgment procedure is done for the second and third channels.

Hereinafter, a phase determination proceeding is explained. The control unit 24 selects one phase among phase 0 showing non ABS control condition in which the ABS control is not initiated although braking action was made, phase I showing a pressure increase phase in which the brake pressure is increased in the ABS control, phase II showing an increased pressure hold phase for holding the brake pressure after the pressure increase phase, phase III showing a pressure reduction phase in which the brake pressure is reduced, phase IV showing a quick pressure reduction phase in which the brake pressure is quickly reduced, and phase V showing a reduced pressure hold phase in which the reduced brake pressure is held after the pressure reduction phase.

In the cascade judgment procedure, the control unit 24 judges a cascade lock condition in which a plurality of wheel locks occur consecutively in a short time period when a predetermined condition, such as low frictional coefficient of the road and the like, are detected. When the control unit 24 judges the cascade lock condition, a cascade flag Fcs is set at 1.

The control unit 24 produces pressure control signals to the first through third valve unit 20, 21 and 23 corresponding to one directed by the phase flag P1 among the above phases in the ABS control for each of the channels. As a result, the brake pressure of the branch brake pressure lines 19a, 19b for the front wheels and pressure lines 22a, 22b for the rear wheels downstream of the valve unit 20, 21 and 23 is increased, reduced, and held after the increase or reduction of the brake pressure.

Hereinafter, a procedure of the calculation of the frictional coefficient μ is explained.

In the case where the frictional coefficient of the road is calculated for the first channel, the coefficient MU1 is calculated based on the wheel speed Vw1 of the front wheel 1 and the acceleration Vg (corresponding to the acceleration AVw1). The calculation is made every 100 milliseconds until 500 milliseconds after the initiation of acceleration operation where the acceleration of the vehicle is not large. The acceleration Vg is calculated as follows:

$$Vg=K1*[Vw1(i)-Vw1(i-100)]$$

After 500 milliseconds has passed from the initiation of the acceleration, the acceleration Vg is calculated as follows;

$$Vg=K2*[Vw1(i)-Vw1(i-500)]$$

In the above equations, Vw1(i) shows the current wheel speed, Vw1(i–100) shows the wheel speed 100 milliseconds ahead, and Vw1(i–500) shows the wheel speed 500 milliseconds ahead.

K1 and K2 are predetermined constants. The friction coefficient MU1 is obtained in light of the table of the friction coefficient μ shown in FIG. 2 based on the wheel speed Vw1 and the acceleration Vg. The term "low friction" corresponds to the range of 1.0–2.5 of the friction coefficient μ. The term "middle friction" corresponds to the range of 2.5–3.5 of the range friction coefficient μ and the term "high friction" corresponds to the range of 3.5–5.0 of the friction coefficient μ. The frictional coefficient MU2 for the second channel is calculated in the similar manner to that for the coefficient MU1 for the first channel using the wheel speed Vw2. The frictional coefficient MU3 is set at the same value as the smaller of the coefficients MU1 and MU2.

Alternatively, the frictional coefficients may be obtained through friction coefficient sensors provided respectively for the first through third channels.

Figure 3:
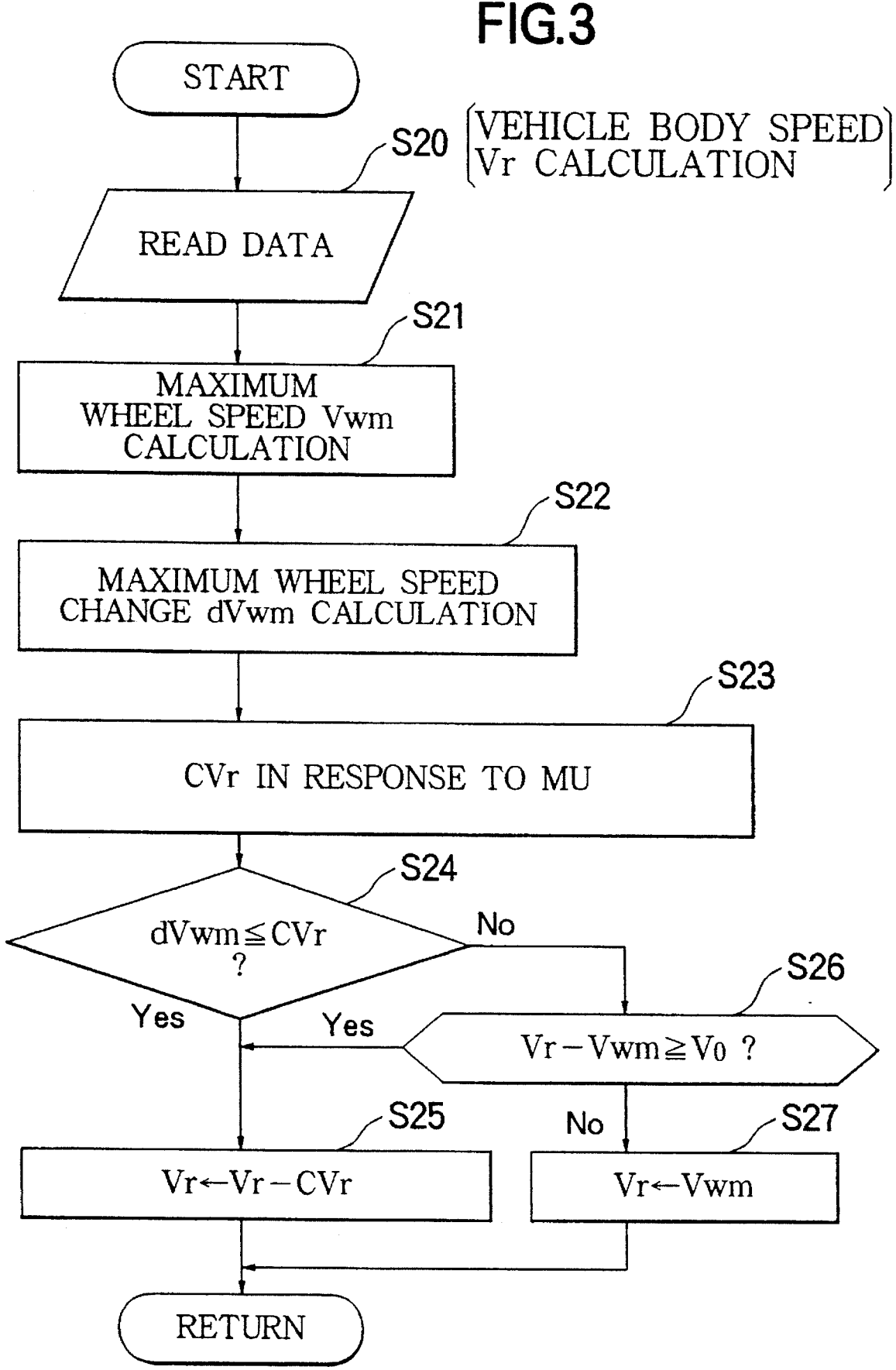
FIG. 3 is a flow chart for calculating a hypothetical vehicle body speed.

Next, a calculating procedure of the vehicle body speed Vr is explained hereinafter taking reference with the flow chart shown in FIG. 3.

Figure 4:
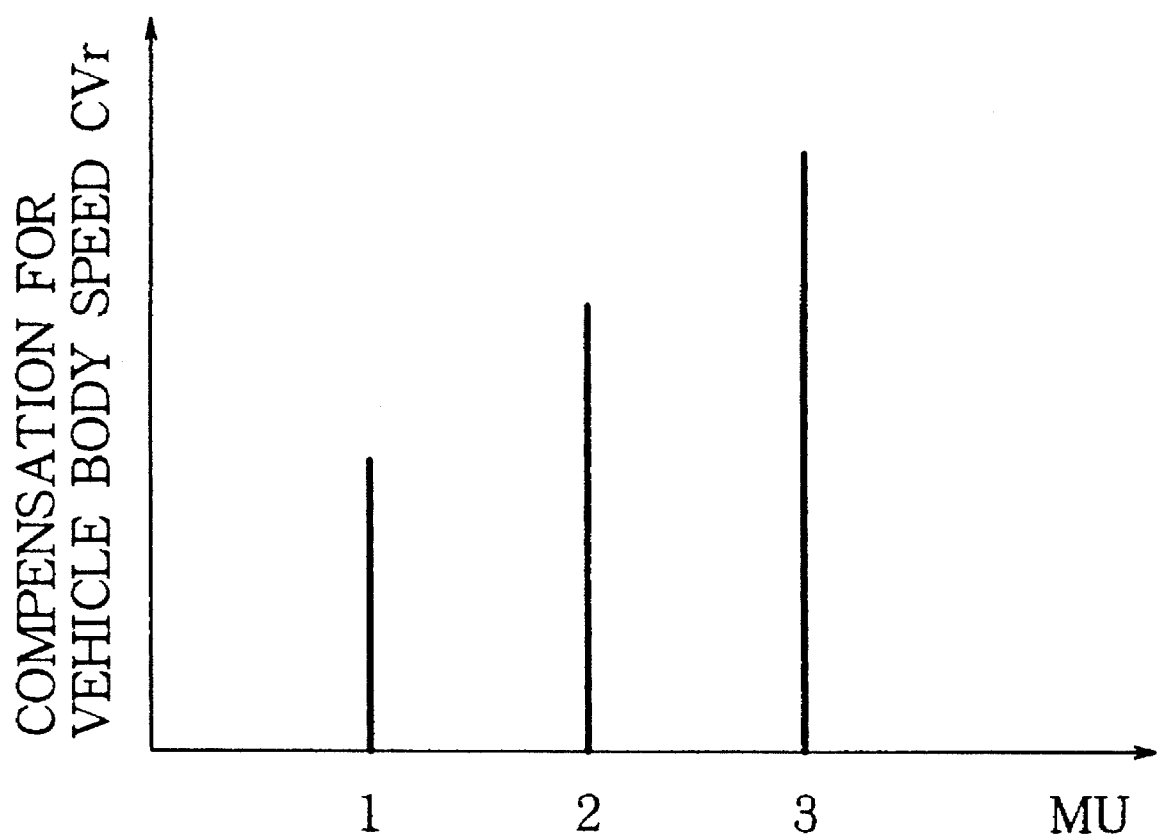
FIG. 4 is a graphical representation showing a compensation value of the vehicle body speed.
Figure 5:
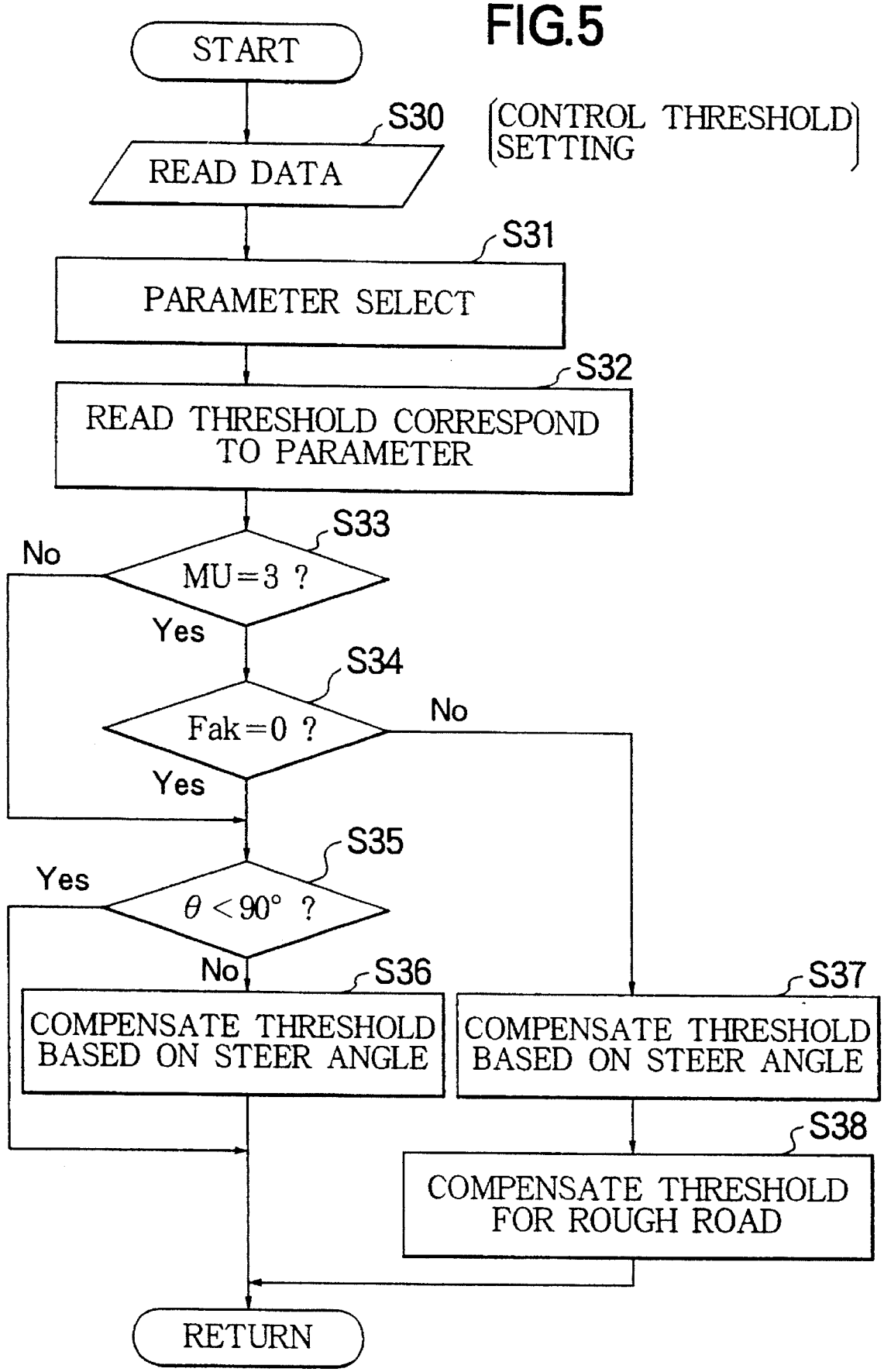
FIG. 5 is a flow chart for calculating a threshold value of a wheel slip rate.

The control unit 24 reads in various data (step S20), and calculates the maximum wheel speed Vwm among the wheel speeds Vw1 through Vw4 obtained through the sensors 27 through 30 (step S21). Next, the control unit 24 calculates a maximum change amount dVwm of the maximum wheel speed Vwm during the sampling period dt. Then, the control unit 24 reads out a vehicle body speed compensation CVr corresponding to the friction MU (minimum value of the road friction of the first to third channels) based on a map shown in FIG. 4 in step S23 and judges whether or not the maximum wheel speed change amount dVwm is not greater than the compensation CVr in step S24.

Where the judgment is Yes and the change amount dVwm is not greater than the value CVr, the control unit 24 replaces the value Vr by the value Vr-CVr. Thus, the vehicle body speed Vr is gradually reduced with a predetermined gradient in accordance with the compensation CVr. On the other hand, if the judgment of the step S24 is No or if the change amount dVwm is greater than the compensation CVr, the control unit 24 further judges whether or not a subtraction of the maximum wheel speed from the hypothetical vehicle body speed Vr is not smaller than a predetermined value V0.

If this judgment is Yes which means that there is a serious difference between the vehicle body speed and the maximum wheel speed Vwm, the control unit 24 replaces the vehicle body speed Vr by the value Vr-CVr.

On the other hand, where the judgment in step S24 is No which means that there is no big difference between the vehicle body speed Vr and the maximum wheel speed Vwm, the control unit 24 executes the step S27 and replaces the vehicle body speed Vr by the maximum wheel speed Vwm. Thus, the value of the vehicle body speed Vr is renewed in accordance with the wheel speed Vw1 through Vw4.

Hereinafter, a calculation procedure of the control threshold is explained with reference to the flow chart of FIG. 5 and FIGS. 6–8. The procedure is carried out for each of the channels independently. For the purpose of the illustration, the calculation procedure of the threshold for the channel 1 is explained hereinafter.

The control unit 24 reads in the various data in step S30 and then selects a running condition parameter in accordance with the friction value MU and the vehicle body speed Vr in light of a table as shown in FIG. 6. In the table, the running condition parameter is provided in accordance with a vehicle body speed range and the frictional coefficient μ as parameters. For example, where the value MU is 1 and where the vehicle body speed is in a middle range, a value LM2 for a middle speed and low friction is selected as the running condition parameter. In this case, the value MU is based on the minimum value among the friction coefficients MU1–MU3 of the first through third channels. In FIG. 6, the values MU of 1, 2 and 3 correspond to the low friction condition, middle friction condition, and high friction condition respectively.

Where the rough road flag Fak is set at 1 which means the vehicle is on a rough road, the control unit 24 selects the running condition parameter in accordance with the vehicle body speed Vr. For example, where the vehicle body speed Vr is in the middle range, the parameter HM2 for the low friction road is forcibly selected. This is because the wheel speed is remarkably changed when the vehicle runs on the rough road.

In step S32, the control unit 24 reads out various control thresholds corresponding to the running condition parameter based on a threshold setting table shown in FIG. 7. The various thresholds includes 1–2 intermediate deceleration threshold B12 for switching the phase I to phase II, 2–3 intermediate slip rate threshold Bsg for switching phase II to phase III, 3–5 intermediate deceleration threshold B35 for switching the phase III to phase V, 5-1 slip rate threshold Bgz for switching phase V to phase I and the like. The thresholds are provided for each of the running condition parameters.

In this case, as the friction value MU is reduced, or as the friction coefficient μ is reduced, the deceleration thresholds which affect badly the brake force approaches 0G so as to maintain a desirable braking performance or the high friction road as well as a good response of the ABS control on the low friction road. Where the parameter LM2 for the middle speed and low friction road is selected, the control unit 24 reads out –0.5G, 90%, 0G, 90% as the thresholds B12, Bsg, B35 and Bsz respectively as shown in FIG. 7.

In step S33, the control unit 24 judges whether or not the value MU is 3. If the judgment is Yes, the control unit 24 further makes a judgment as to whether or not the rough road flag Fak is 0 in step S34. If the rough road flag Fak is 0, the control unit 24 judges whether or not the absolute value of the steering angle θ sensed by the steering angle sensor 26 is smaller than 90 degrees in step S35. If Yes, the control unit 24 makes a compensation of the threshold in accordance with the steering angle θ in step S36. The compensation is made in light of a table shown in FIG. 8. In FIG. 8, the thresholds are compensated in accordance with the steering angle. In the low friction road, middle friction road, and the high friction and not rough road, in order to improve a steering performance, the thresholds Bsg and Bsz are increased by adding 5% to be set as final thresholds respectively. The other intermediate thresholds are used as final values without change. When the flag Fak is 1 and when the vehicle is on the rough road, in order to improve a running performance in a small steering angle, the values Bsg and Bsz are reduced by subtracting 5% to be set as final values. In step S35, if the judgment is No, each of the intermediate thresholds is used as it is for a final threshold value.

On the other hand, where the rough road flag Fak is set at 1 in step S34, the control unit 24 compensates the thresholds Bsg and Bsz based on the table of FIG. 8 in connection with the value of the flag Fak and the steering angle θ in step S37 to set the final values Bsg and Bsz. In step S38, the control unit 24 subtracts 1.0 G from the intermediate threshold B12 to set a final threshold B12. This procedure is made to obtain an effective braking operation to reducing the responsiveness of the control in view of possible erroneous detection of the wheel sensors 27–30. The rest of the intermediate thresholds are set as they are for final thresholds. In addition, where the control unit 24 holds that the friction value MU is not 3 in step S33, the step S35 is executed. As for the second and third channels, the threshholds are set as aforementioned in connection with those of the first and second channels.

Figure 16:
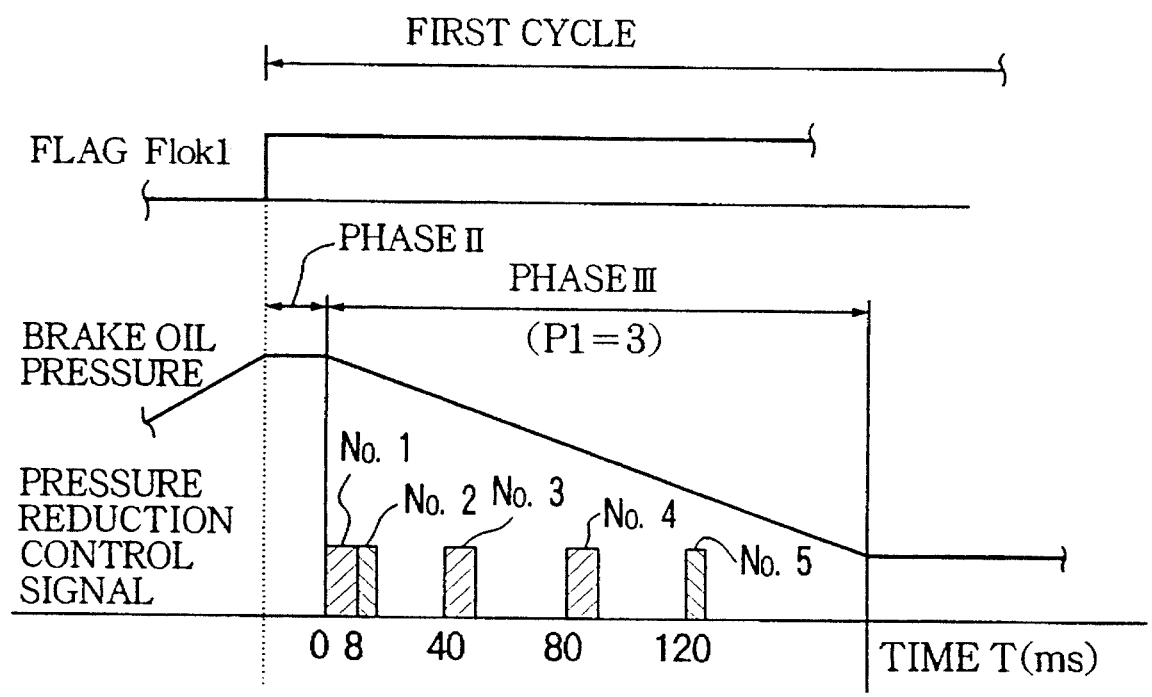
FIG. 16 is a graphical representation of a time chart of a phase III of a first control cycle.

Next, the control signal output procedure in which the brake phase is determined to produce the control signals to the valve unit is explained taking reference with flow chart of FIGS. 9–13 and other FIGS. 14–16. The procedure is repeated every 4 milliseconds.

First, the control unit 24 reads various data (step S40) and judges whether or not a brake switch 25 is On. If Yes, the control unit 24 further judges whether or not the vehicle body speed Vr is not greater than a predetermined value C1 (for example, 5.0 Km/H), and whether or not the wheel speed Vw1 is not greater than a predetermined value (for example 7.5 Km/H). If the judgment is Yes, this means that there is no need to execute the ABS control. Thus, the control unit 24 returns through step S42. If the judgment is No in step S43, step S44 is carried out. In step S42, the phase flag P1, lock flag Flok1, continue flag Fcn1 and flag F is reset at 0. Then, the procedure is returned to step S44.

In step S44, the control unit 24 judges whether or not the lock flag Flok1 is 0. If the flag Flok1 is 0, step S45 is carried out where a judgment is made as to whether or not the deceleration DVw1 of the wheel speed Vw1 (DVw1=<0) is not greater than a predetermined value D0 (for example −3G). If the judgment is Yes, step S46 is executed. If the judgment is No in the step S44, step S49 is executed. If the judgment in step S45 is Yes, the lock flag Flok1 is set at 1 in step S46 and flag P1 is set at 2 so that the phase is switched to phase II (the increased pressure hold phase) in step S47. A control signal predetermined for the phase II is produced to the first valve unit 20 in step S48. The procedure is then returned.

After initiation of the ABS control, the flag Flok1 is set at 1. Thus, the control unit 24 judges whether or not the flag P1 is 2. Where the flag P1 is 2, step S50 is carried out. If the flag P1 is not set at 2, step S54 is carried out. In step S50, the control unit 24 judges whether or not the slip rate S1 is not greater than the threshold Bsg. If No, step S48 is carried out. If the slip rate is changed below the threshold value Bsg, step S51 is carried out. In the step S51, the flag P1 is set at 3 so that the phase is switched to the phase III (pressure reduction phase). In step S52, a timer T starts for counting the time after the initiation of the phase III. In step S53, the control signal is produced to the first valve unit 20 and then the procedure is returned to the top of the routine. The procedure of the step S53 will be explained later taking reference with FIGS. 11 to 13.

Based on the judgment of step S49, if the flag P1 is not 2, step S54 is executed where a judgment is made as to whether or not the flag P1 is 3. If the judgment is Yes, step S55 is carried out. If No, step S59 is carried out.

In step S55, the control unit 24 judges whether or not the wheel deceleration DVw1 is equal to the threshold B35. At first, the judgment is No so that the procedure is transferred from step S55 to S53. Where the wheel deceleration Dvw1 is equal to the threshold value B35, step S56 is carried out where the flag P1 is set at 5 so that the phase is switched to phase V (reduced pressure hold phase). In step S57, Flag F which is utilized in a sub routine for carrying out the procedure of step S53 is reset at 0.

In step S58, the control signal for the phase V is produced to the valve unit 20 and then the procedure is returned to the top of the routine. If the judgment is No in step S54, the control unit 24 judges whether or not the flag P1 is 5. If the judgment is Yes, step S60 is carried out. If No, step S67 is carried out. If the flag P1 is 5, a judgment is made as to whether or not the slip S1 is not smaller than the threshold Bsz in step S60. At first, the judgment is No so that the steps S60 to S58 are repeated. Then, the slip rate S1 is increased to make the judgment in the step S60 Yes, step S61 is carried out. In step S61, the flag P1 is set at 1 so that the phase is transferred to the phase I (pressure increase phase) and the continuous flag Fcn1 is set at 1.

In step S62, a quick pressure increase time Tpz for making a quick pressure increase action is calculated which is carried out in the initial stage of the phase I. The time is set at a value proportional to a pressure increase time T1 in the preceding cycle calculated and stored in step S70. In step S63, a timer T1 starts for counting the time after the initiation of the phase I. In step S64, a judgment is made as to whether or not the counted time of the timer T1 is not greater than the quick pressure increase time Tpz set in the step S62. At first, the judgment is Yes so that the step S64 and S65 are carried out. In step S65, the control signal for the initial quick pressure increase action is produced to the first valve unit 20 and then the procedure is returned to the top.

Next, when the phase is transferred to the phase I, the judgment in step S59 is made No so that step S67 is carried out in which a judgment is made as to whether or not the flag P1 is 1. If the flag P1 is 1, the control unit 24 judges whether or not the wheel deceleration DVw1 is not greater than the threshold value B12. At first, the judgment is No so that the steps S68 and then S64 are carried out. As a result, the steps S64 and S65 are repeated until the time Tpz passes by. The time Tpz has passed in the phase I, the judgment in step S64 made No so that the procedure is transferred from the step S64 to the step S66 where the control signal is produced for a gradual pressure increase action in the phase I is produced and the procedure is returned to the top of the routine.

Next, when the judgment is turned Yes in the step S68, the flag P1 is set at 2 in step S69. In step S70, the pressure sure increase time Ti (the time period of phase I) is calculated and stored and then step S48 is carried out.

As aforementioned, the ABS control is repeatedly executed in the order of phase II, phase III, phase V, phase I, phase II, phase III, and the like when it is initiated. The ABS control is stopped when the judgment in step S43 is turned Yes or when the brake switch is turned off (see FIG. 15).

Hereinafter, a subroutine concerning the procedure in the step S53 is explained taking reference with FIGS. 11–13 and FIGS. 14–16.

The pressure reducing action in the phase III of the first cycle is done intermittently with five times of the first to fifth action as shown in FIG. 16 by opening the relief valve 20b. The amount of each pressure reducing action depends on the opening time of the valve 20b.

FIG. 14 is a table of a pressure reduction level and amount in which starting timings of the respective pressure reducing actions, a pressure reduction level and a pressure reduction amount are provided.

The pressure reduction level DL, DM, DS, DVS are determined based on a reduction variable DV which is calculated by the following formula:

$$DV = Sm + kc*(\text{absolute value of the wheel deceleration})$$

Wherein Sm:slip amount (Vr-Vw), and kc is a constant.

When k3=<DV, the pressure reduction level=DL (large).

When k2=<DV<k3, the reduction level=DM (middle).

When k1=<DV<k2, the reduction level=DS (small).

When DV<k1, the reduction level=DVS(very small).

In this case, the values k1, k2 and k3 may be provided as follows;

K3=0.25 Vr, k2=0.10 Vr, k10.05 Vr.

Thus, the reduction variable DV is calculated based on the slip amount Sm and the wheel deceleration. The pressure reduction level DL, DM, DS and DVS are calculated based on the reduction variable DV and vehicle body speed Vr. The pressure reduction amount is determined based on a map of FIG. 14 in light of the pressure reduction level. Therefore, in each of the pressure reducing actions, the control unit 24 produces a control signal for opening the relief valve 20b for a time period corresponding to the pressure reduction amount to accomplish a desirable pressure reduction.

Figure 11:
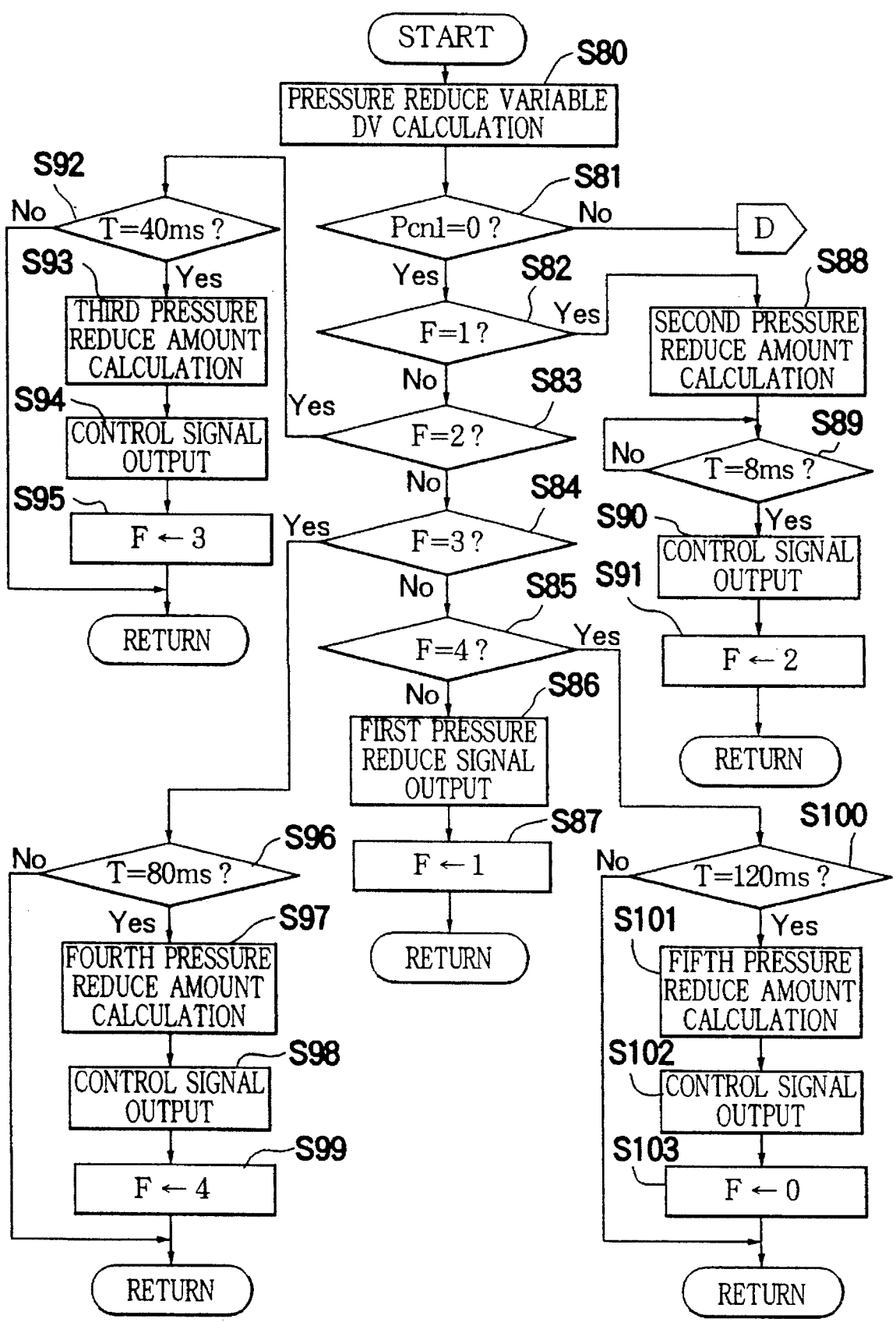
FIG. 11 is a front portion of a flow chart of a subroutine of a control signal output in FIG. 9.

In the flow chart of FIG. 11, first, the reduction variable DV and the pressure reduction level are calculated in step S80. The control unit 24 then judges whether or not the continuous flag Fcn1 is 0. If the flag Fcn1 is 0, and if the phase III is being executed in the first cycle, step S82 is carried out. In steps S82–S84, the judgment of flag F is carried out. If the flag F is 0, the step S86 is carried out so that a control signal for a first pressure reducing action is produced. The first pressure reducing action is done with a predetermined amount (for example, pressure reduction time 8 milliseconds, or 16 milliseconds when the friction coefficient μ is high) irrespective of the pressure reduction level in which the control signal for opening the relief valve 20b for 8 ms or 16 ms is produced. In step S87, the flag F is set at 1 and the procedure is returned to the top of the routine.

Where the flag F is 1, the steps S82–S88 are carried out in which a pressure reduction amount for a second pressure reducing action is calculated based on the map of FIG. 14 of the pressure reduction level. In step S89, a judgment is made as to whether or not 8 ms has been passed by means of the timer T which had been started at step S52. If T=8 ms, the control unit 24 produces a control signal for opening the relief valve 20b for a time period corresponding to the pressure reduction amount in step S90 and sets the flag F at 2. Thereafter, the procedure is returned to the top of the routine. Namely, the second pressure reducing action is done consecutively following the first pressure reducing action. Meanwhile, where the frictional coefficient μ is higher than a predetermined value, as stated in the remarks of FIG. 14, the pressure reduction amount is increased by 3 ms.

Next, where the flag F is 2, the procedure is forwarded from the step S83 to the step S92 in which a judgment is made as to whether or not the time counted by the timer T reaches 40 ms. In the case of T<40 ms, the procedure is repeated. When the time T reaches 40 ms, the pressure reduction amount for a third pressure reducing action is calculated based on the map of FIG. 14 and the pressure reduction level in step S93. In step S94, the control unit produces the control signal for opening the relief valve 20b for a predetermined time period corresponding to the pressure reduction amount and sets the flag F at 3 in step S95, and thereafter makes return. The third pressure reducing action is initiated 40 ms after the timer T is started. Meanwhile, as stated in the remarks of FIG. 14, where the frictional coefficient μ is smaller than a predetermined value, the pressure reduction amount after the third pressure reducing action is increased by 2 ms.

Next, where the flag F is 3, the procedure is forwarded from the step S84 to step S96 in which a judgment is made as to whether or not the time counted by the timer T reaches 80 ms. In the case of T<80 ms, the procedure is repeated. When the time T reaches 80 ms, the pressure reduction amount for a fourth pressure reducing action is calculated based on the map of FIG. 14 and the pressure reduction level in step S97. In step S98, the control unit 24 produces the control signal for opening the relief valve 20b for a predetermined time period corresponding to the pressure reduction amount and sets the flag F at 4 in step S99, thereafter makes return. The fourth pressure reducing action is initiated 80 ms after the timer T started.

Next, where the flag F is 4, the procedure is forwarded from the step S85 to step S100 in which a judgment is made as to whether or not the time counted by the timer T reaches 120 ms. In the case of T<120 ms, the procedure is repeated. When the time T reaches 120 ms, the pressure reduction amount for a fifth pressure reducing action is calculated based on the map of FIG. 14 and the pressure reduction level in step S101. In step S102, the control unit 24 produces the control signal for opening the relief valve 20b for a predetermined time period corresponding to the pressure reduction amount and sets the flag F at 0 in step S99, thereafter makes return. The fifth pressure reducing action is initiated 120 ms after the timer T started.

As a result of the judgment in step S81, where the flag Fcn1 is 1, in other words where the ABS control is in the phase III in or after the second cycle, the control unit 24 carries out step S104. The control unit judges the value of the flag F. If the flag F is 0, step S107 is carried out where the pressure reduction amount for the first pressure reducing action is calculated. It should be noted that even the pressure reduction amount for the first pressure reducing action is calculated based on the map of FIG. 14 and the pressure reduction level in and after the second cycle. In step S108, the control unit 24 produces the control signal for opening the relief valve 20b for the time period corresponding to the pressure reduction amount, sets the flag F at 1 and then makes return. Meanwhile, where the frictional coefficient μ is greater than a predetermined value, the pressure reduction amount for the first pressure reducing action is increased by 3 ms.

Next, where the flag F is 1, the procedure is forwarded from the step S104 to the step S110 in which a judgment is made as to whether or not the time counted by the timer T reaches 40 ms. In the case of T<40 ms, the procedure is repeated. When the time T reaches 40 ms, the pressure reduction amount for the second pressure reducing action is calculated based on the map of FIG. 14 and the pressure reduction level in step S111. In step S112, the control unit produces the control signal for opening the relief valve 20b for a predetermined time period corresponding to the pressure reduction amount and sets the flag F at 2 in step S113, thereafter makes return. The second pressure reducing action is initiated 40 ms after the timer T started. Meanwhile, where the frictional coefficient μ is smaller than a predetermined Value, the pressure reduction amount after the second pressure reducing action is increased by 2 ms.

Next, where the flag F is 2, the procedure is forwarded from the step S105 to the step S114 in which a judgment is made as to whether or not the time counted by the timer T reaches 80 ms. In the case of T<80 ms, the procedure is repeated. When the time T reaches 80 ms, the pressure reduction amount for the third pressure reducing action is calculated based on the map of FIG. 14 and the pressure reduction level in step S115. In step S116, the control unit produces the control signal for opening the relief valve 20b for a predetermined time period corresponding to the pressure reduction amount and sets the flag F at 3 in step S117, thereafter makes return. The third pressure reducing action is initiated 80 ms after the timer T started.

Figure 13:
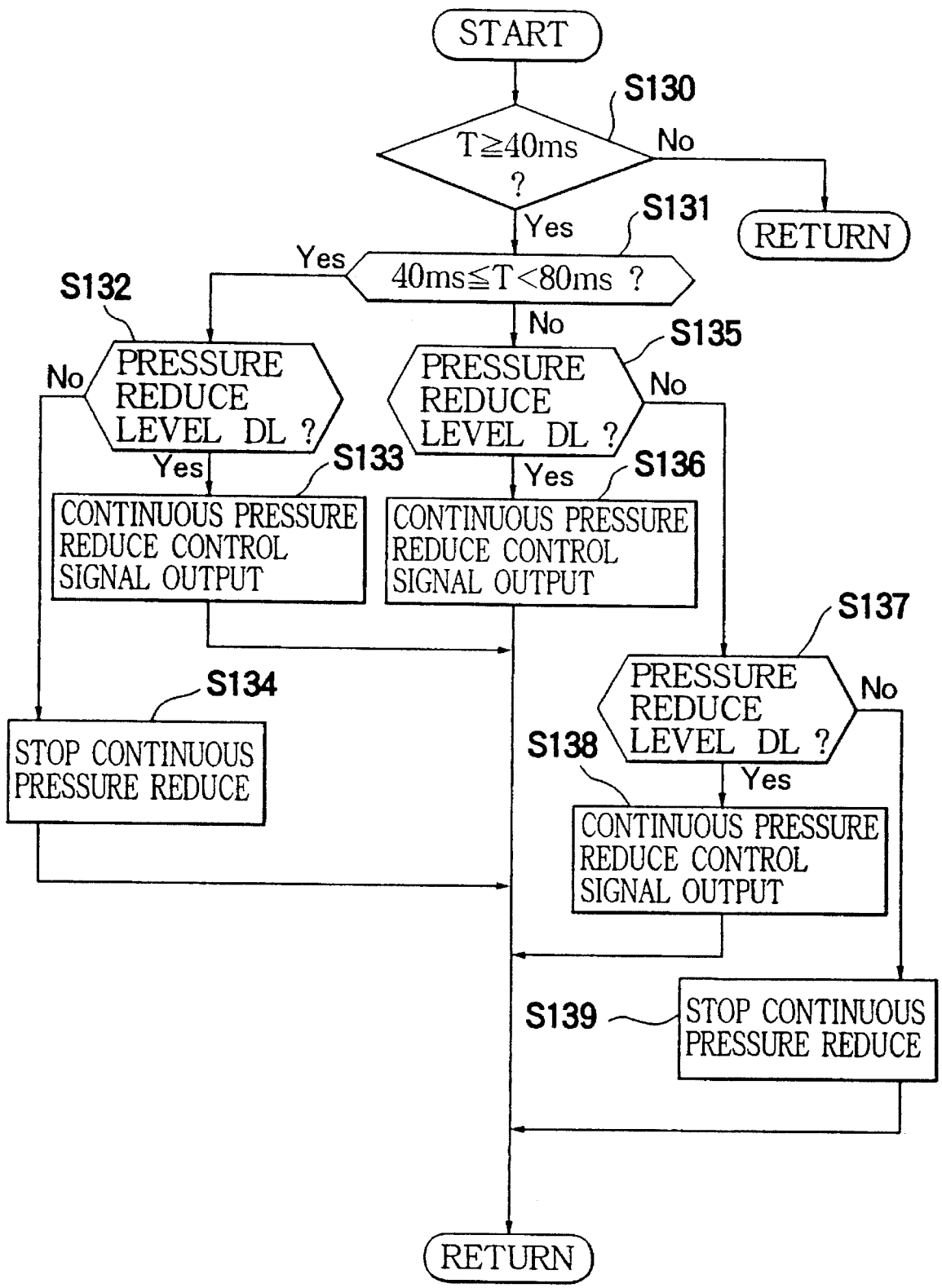
FIG. 13 is a flow chart of a control signal output process executed in parallel with the routines of FIGS. 11 and 12.

Next, where the flag F is 3, the procedure is forwarded from the step S106 to the step S118 in which a judgment is made as to whether or not the time counted by the timer T reaches 120 ms. In the case of T<120 ms, the procedure is repeated. When the time T reaches 120 ms, the pressure reduction amount for the fourth pressure reducing action is calculated based on the map of FIG. 14 and the pressure reduction level in step S119. In step S120, the control unit produces the control signal for opening the relief valve 20b for a predetermined time period corresponding to the pressure reduction amount and sets the flag F at 0 in step S121, thereafter makes return. The fourth pressure reducing action is initiated 120 ms after the timer T started.

Where the road friction μ is suddenly changed from a large value to a small one, the control unit 24 executes a subroutine shown in the form of a flow chart in FIG. 13.

As a result of the judgment of step S130, the procedure is returned to the top of the routine before the time counted by the timer T reaches 40 ms. In the case of 40 ms=<T<80 ms, step S131 is carried out. In step S132, the control unit 24 judges whether or not the pressure reduction level is DL. If Yes which means a large amount of the pressure reduction is required, the control unit 24 produces a control signal for opening the relief valve 20b consecutively in step S133 and makes return. If the consecutive pressure reduction makes the judgment No in the step S132, the control unit 24 produces a control signal for stopping the consecutive pressure reduction and makes return.

In the case of T>=80 ms, the procedure is forwarded from the step 131 to step S135. In step S135, the control unit judges whether or not the pressure reduction level is DL. If yes, the control signal is produced to consecutively open the relief valve 20b and the procedure is returned to the top of the routine. When the judgment in step S135 is turned No, the step S137 is carried out. In step S137, the control unit judges whether or not the pressure reduction level is DL. If yes, the control signal is produced to consecutively open the relief valve 20b in step S138 and the procedure is returned to the top of the routine. When the judgment in step S137 is turned No, the step S139 is carried out.

Hereinafter, the operation of the ABS control for the first channel is explained as an example taking reference with a time chart in FIG. 15.

In the non-ABS condition in the case when the vehicle reduces the speed, the brake pressure is increased in response to the driver's stroke of the brake pedal. When the change rate of the wheel speed Vw1 of the left front wheel 1 or the deceleration DVw1 reaches −3G as a result of the increase of the brake pressure, the lock flag Flok1 of the first channel is set at 1 at a time ta when the ABS control starts.

In the first cycle just after the ABS control started, the friction value MU is set at a value in accordance with the road friction condition and various thresholds are determined in accordance with the running condition parameter. Next, the control unit 24 compares the slip rate S1, wheel deceleration DVw1, wheel acceleration AVw1 with the various thresholds. Then, the phase is changed from phase 0 to phase II and the brake pressure is maintained at a level just after the pressure increase.

Where the slip rate S1 is reduced below the threshold Bsg, the phase is switched from the phase II to phase III so that the relief valve 20b is controlled On and Off to get a desirable pressure reduction characteristic in accordance with the aforementioned procedure. Thus, the brake pressure begins to be reduced from the time tb with a predetermined gradient and the wheel rotation begins to be increased again.

Thereafter, where the pressure reduction continues and the deceleration DVw1 is reduced to the threshold B35 (0G), the phase is switched from the phase III to phase V at the time tc when the brake pressure is held at a value of the reduced brake pressure.

In the phase V, where the slip rate S1 increases beyond the threshold Bsz, the continuous flag Fcn1 is set at 1 and the ABS control enters the second cycle at a time td. In this case, the control unit 24 switches to the phase I. Just after the start of the phase I, the on-off valve 20 is opened with a 100 duty ratio whereas the relief valve 20b is kept closed for the time period Tpz which is determined based on the pressure increase time Ti in the preceding executing cycle. Thus, the quick pressure increase is done during the time period Tpz. After the time period Tpz in which the quick pressure increase action is made passes, the on-off valve 20a is on-off controlled with a predetermined duty ratio so that the brake pressure is increased with a gradual gradient. Thus, just after the second cycle starts, the brake pressure can be reliably increased to improve the brake performance.

A proper friction value MU is determined in and after the second cycle as well as the first cycle. The thresholds are selected in light of the table of FIG. 7 corresponding to the running parameter in accordance with the friction value MU and the vehicle body speed Vr.

In the phase V of the second cycle, the phase V is switched to the phase III where the slip ratio S1 is greater than the threshold Bsz.

According to the ABS control of the present invention, where the pressure reduction phase of the first cycle in which the continuous flag Fcn1 is 0, the pressure reduction amount in the first cycle is set at the predetermined value (8 ms as opening time of the relief valve, but 16 ms in the case of the high road friction condition) and the pressure reducing action is carried out in accordance with the pressure reduction amount as aforementioned. Therefore, the first pressure reducing action can be done without being affected by unstable slip rate or unstable wheel deceleration at the initial stage of the ABS control. Thereafter, the pressure reduction amount for the second pressure reducing action is determined based on the slip amount Sm and the wheel deceleration at the end of the first pressure reducing action. Thus, there is no influence by the unstable slip rate and wheel deceleration at the initial stage of the ABS control in determining the second pressure reduction amount and in executing the second pressure reducing action as well.

In addition, the second pressure reducing action is executed consecutively following the first pressure reducing action as shown in FIG. 16. As a result, the sufficient pressure reduction can be accomplished at the initial stage of the pressure reduction phase in the first cycle. Therefore, it is prevented that a pressure reduction performance is deteriorated.

As aforementioned, there is a certain response delay time (20 ms–30 ms) of the brake control system. It should be noted that the following pressure reducing action may be executed before the response delay time passes. This means that the following action is made before the result of the preceding action is turned out. Therefore, an improper pressure reduction, such as an excessive or short pressure reduction may occur.

In view of this, according to the present invention, the third or the following pressure reducing actions are executed at every 40 ms, which is longer than the response delay time of the brake pressure control system, after the first and second pressure reducing action have been done. Thus, the following pressure reducing action is made based on the result of the preceding pressure reducing action. Therefore, the above problem, such as excessive or short pressure reduction can be effectively eliminated to improve the braking performance with suppressing the wheel slip. The above efficient pressure reducing action would improve the durability of the relief valve. This effect can be obtained in and after the second cycle of the ABS control.

Figure 12:
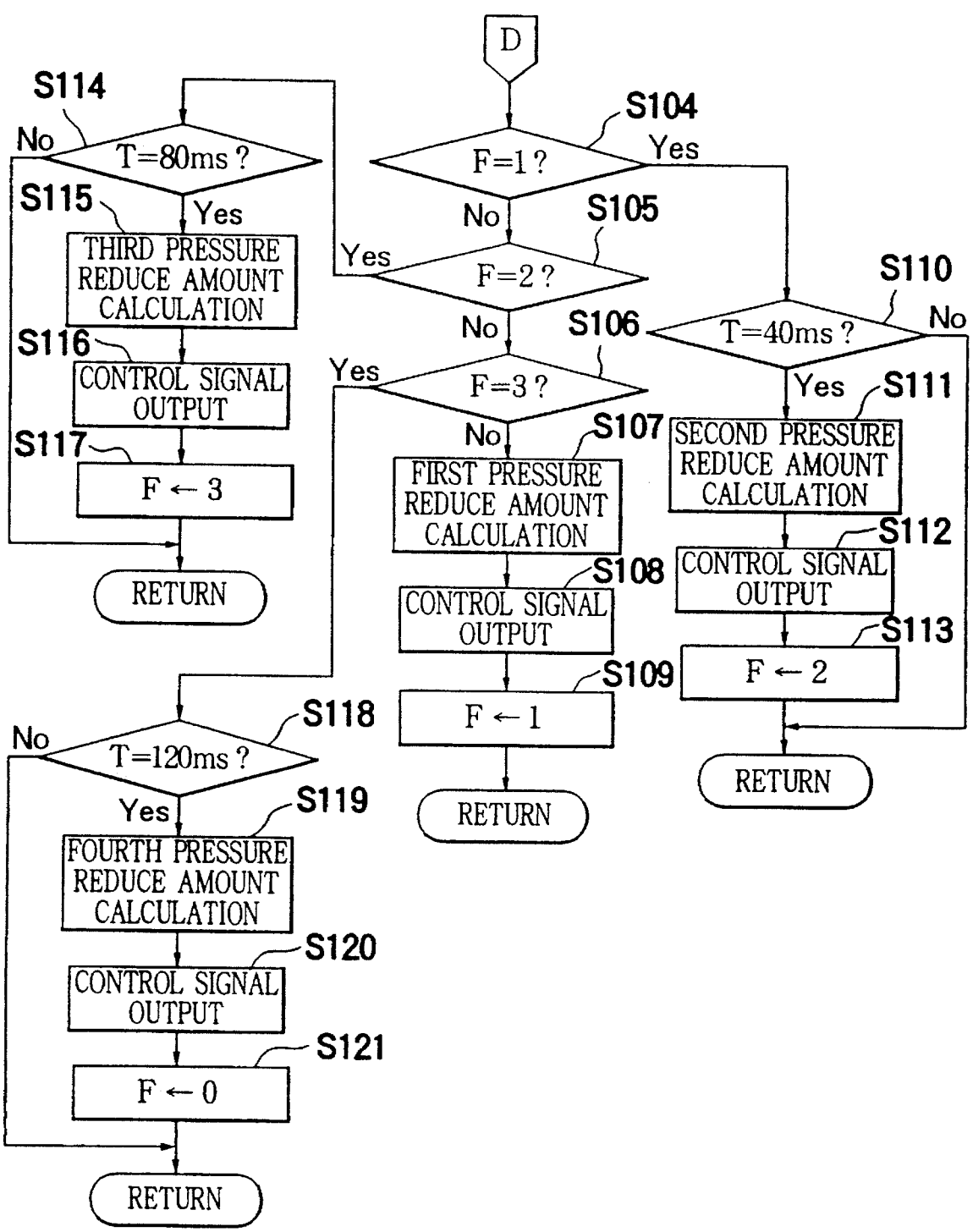
FIG. 12 is the rest of the flow chart of a subroutine of a control signal output in FIG. 9.

Further, the subroutine of FIG. 13 independent from the subroutines of FIGS. 11 and 12 is executed so that a desirable pressure reduction can be made even where the road friction is abruptly changed from a high value to a low one.

Further, according to the present invention, as the road friction is increased and thus the deformation of the wheel tire is increased, the brake pressure reduction amount in the second brake pressure reducing action is increased to reduce an undue and excessive deformation of the wheel. As a result, the wear amount of the wheel tire can be reduced to improve the tire durability.

In the case of low road friction condition, the pressure reduction amount is increased so as to increase the pressure reduction speed of the brake system to thereby make the brake control system responsive.

Figure 9:
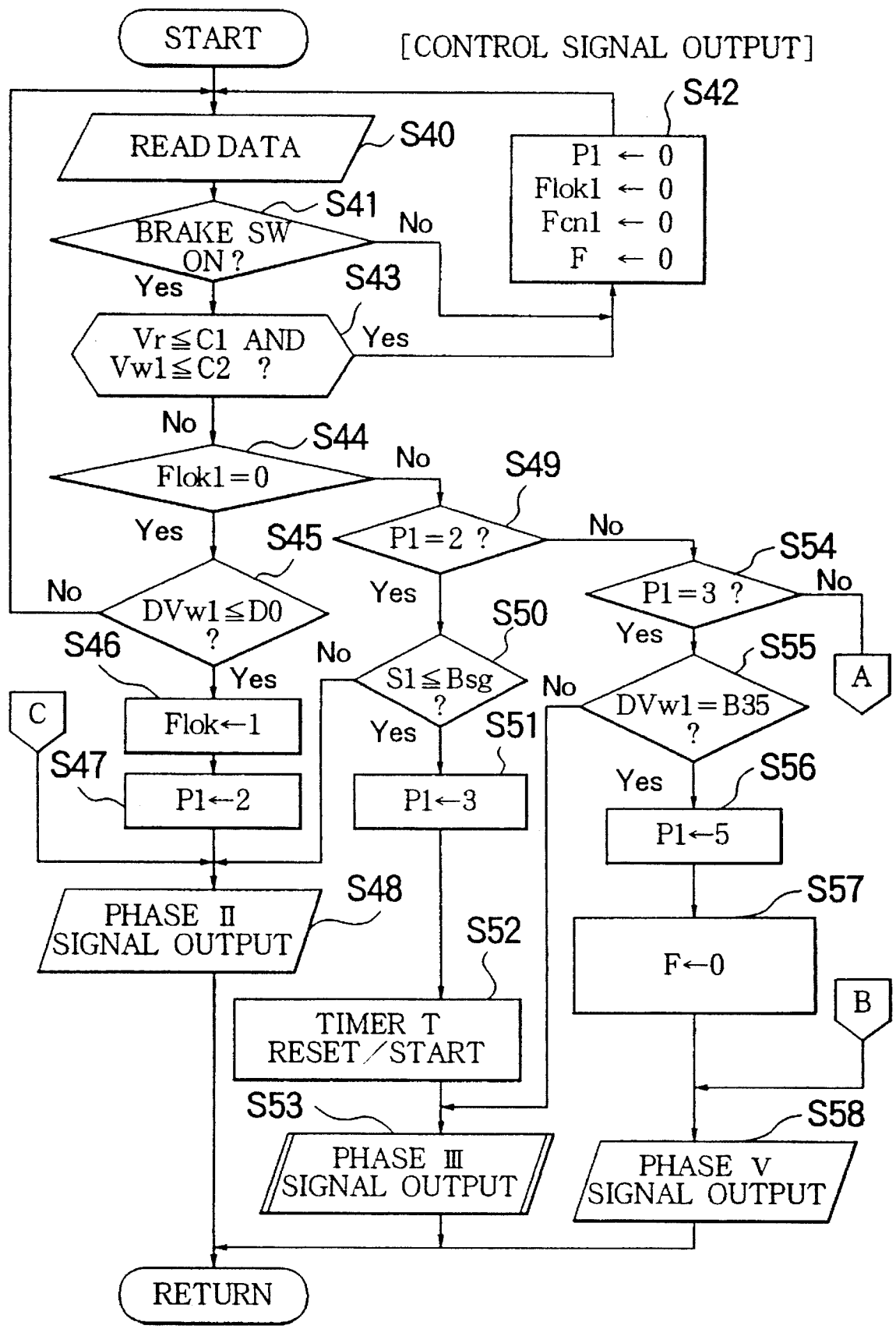
FIG. 9 is a flow chart of a front portion for processing control signals.
Figure 10:
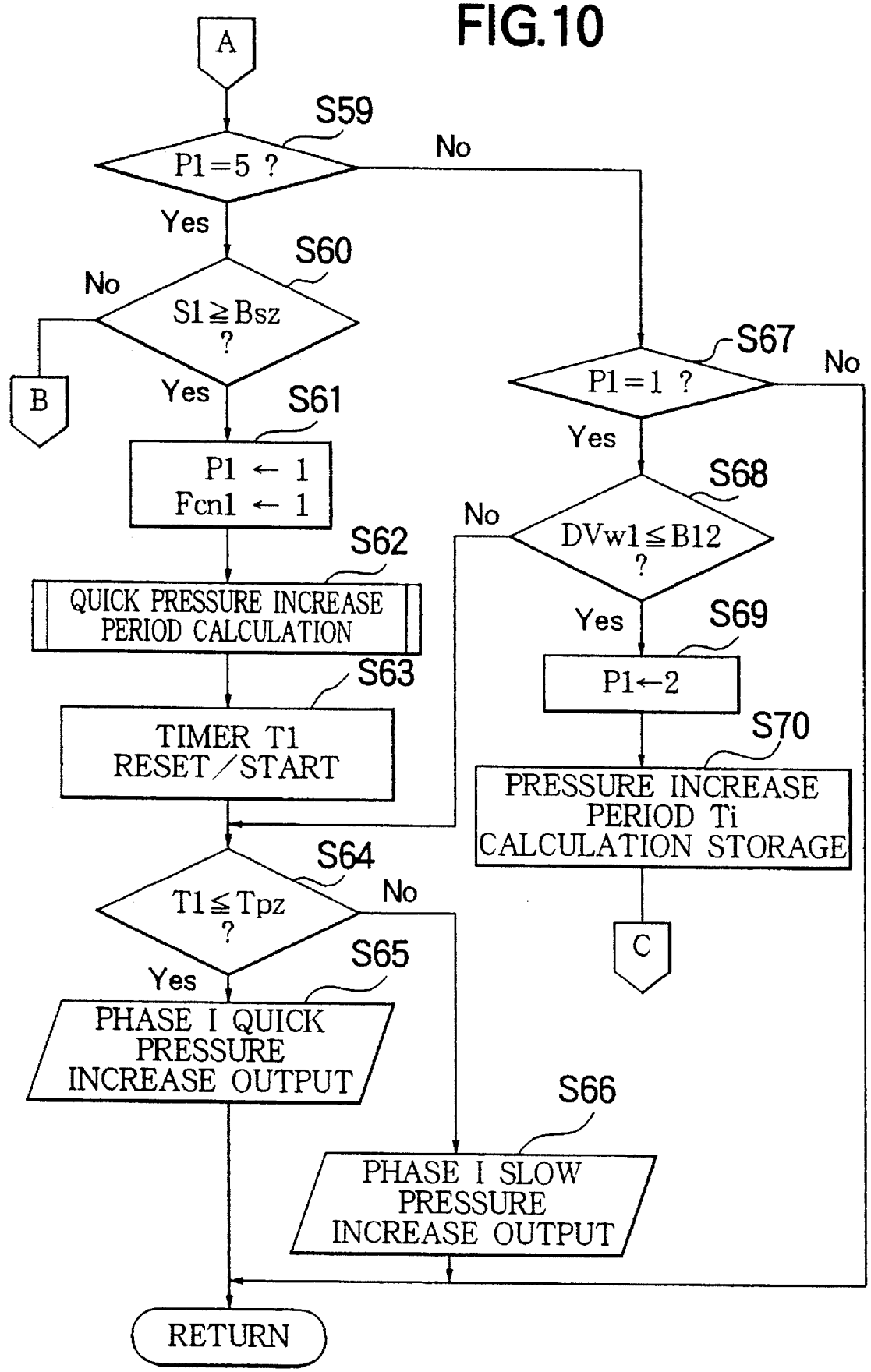
FIG. 10 is the rest of the flow chart of FIG. 9.

According to the illustrated embodiment, the procedure shown in FIGS. 9 and 10 are executed at every 4 ms and the second pressure reduction amount in step S88 is calculated based on the data read in for determining the first pressure reduction amount. It should, however, be noted that the second pressure reduction amount may be calculated based on the data different from those for calculating the first pressure reduction amount. Although the pressure reduction amount is provided corresponding to the opening time period of the relief valve in the illustrated embodiment, the amount may be provided based on the brake pressure which can be obtained through the brake pressure sensor. Alternatively, the amount can be provided based on a duty ratio for controlling the relief valve.

According to the illustrated embodiment, the pressure reduction variable DV is provided by the aforementioned formula, namely slip amount Sm+kc*(absolute value of the wheel acceleration or deceleration). However, either one parameter Sm or kc*(absolute value of the wheel acceleration or deceleration) may be used to determine the variable DV. Further, the slip rate S1 may be used in lieu of the slip amount Sm.

In the illustrated embodiment, the brake system is provided with the first to third channels which are independently controlled. It should, however, be noted that the present invention can be applied to the brake system of a vehicle including four channels which are independently controlled. Further, although the ABS control cycle consists of four control phases, that is, pressure increase phase, increased pressure hold phase, pressure reduction phase, and reduced pressure hold phase in the illustrated embodiment, the control cycle may consist of two control phases, namely, pressure increase phase and pressure reduction phase.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. An anti-skid control system of a vehicle comprising:
   a wheel speed sensor for sensing a wheel rotation speed,
   a hydraulic pressure adjusting device for adjusting a brake pressure of a hydraulic fluid in the control system,
   an anti-skid brake controller for controlling the hydraulic pressure adjusting device based on the wheel rotation speed detected so that the brake pressure is cyclically changed in accordance with a control cycle including at least a pressure reduction phase, in which the brake pressure is reduced, and a pressure increase phase, in which the brake pressure is increased, and
   a brake pressure control device for (1) detecting the pressure reduction phase, (2) determining a brake pressure reduction amount based on a wheel operation parameter and (3) executing a brake pressure reducing action in the pressure reduction phase repeatedly at a predetermined interval, said predetermined interval being longer than a response delay time of the hydraulic pressure adjusting device from a command signal thereto.

2. An anti-skid control system as recited in claim 1 wherein the wheel operation parameter is wheel slippage.

3. An anti-skid control system as recited in claim 1 wherein the wheel operation parameter is wheel deceleration.

4. An anti-skid control system as recited in claim 1 wherein the wheel operation parameter is wheel slippage and wheel deceleration.

5. An anti-skid control system in claim 1 wherein the brake pressure reduction amount in each brake pressure reducing action is increased as the wheel operation parameter is increased.

6. An anti-skid control system as recited in claim 5 wherein the brake pressure reduction amount is gradually reduced until a predetermined time passes after the brake pressure reduction phase is initiated and is gradually increased after the predetermined time passes.

7. An anti-skid control system as recited in claim 6 wherein the brake pressure reduction amount is provided in light of a map based on a brake pressure reduction level and a brake pressure reducing action timing.

8. An anti-skid control system as recited in claim 7 wherein a continuous brake pressure reducing action is executed when the brake pressure reduction level in the pressure reduction phase is greater than a first predetermined value after the predetermined time period passes.

9. An anti-skid control system as recited in claim 8 wherein when the brake pressure reduction level is greater than a second predetermined value after a time period twice as long as the predetermined time, the continuous brake pressure reducing action is executed.

10. An anti-skid control system as recited in claim 1 wherein the brake pressure reduction amount is increased after a predetermined time passes from a first brake pressure reducing action.

11. An anti-skid control system of a vehicle comprising:

a wheel speed sensor for sensing a wheel rotation speed, a hydraulic pressure adjusting device for adjusting a brake pressure of a hydraulic fluid in the control system, an anti-skid brake controller for controlling the hydraulic pressure adjusting device based on the wheel rotation speed detected so that the brake pressure is cyclically changed in accordance with a control cycle including at least a pressure reduction phase, in which the brake pressure is reduced, and a pressure increase phase, in which the brake pressure is increased, a brake pressure control device for (1) detecting the pressure reduction phase, (2) determining a brake pressure reduction amount based on a wheel operation parameter and (3) executing a brake pressure reducing action in the pressure reduction phase repeatedly at a predetermined interval, and a friction coefficient detector for detecting a friction coefficient of a road on which the vehicle is running, wherein when the friction coefficient is greater than a predetermined value, the brake pressure reduction amount in a first brake pressure reducing action is increased.

12. An anti-skid control system of a vehicle comprising:

a wheel speed sensor for sensing a wheel rotation speed, a hydraulic pressure adjusting device for adjusting a brake pressure, and an anti-skid brake controller for controlling the hydraulic pressure adjusting device based on the wheel rotation speed detected so that the brake pressure is cyclically changed in accordance with a control cycle including at least a pressure reduction phase, in which the brake pressure is reduced, and a pressure increase phase, in which the brake pressure is increased, wherein a first brake pressure reducing action is executed with a predetermined amount, determined regardless of a value of a wheel operation parameter, when the pressure reduction phase of a first control cycle starts after an anti-skid brake control is initiated and a second brake pressure reducing action is executed following the first brake pressure reducing action with an amount which is calculated based on a wheel operation parameter at an end of the first brake pressure reducing action.

13. An anti-skid control system as recited in claim 12 wherein the wheel operation parameter is wheel slippage.

14. An anti-skid control system as recited in claim 12 wherein the wheel operation parameter is wheel deceleration.

15. An anti-skid control system as recited in claim 12 wherein the wheel operation is wheel slippage and wheel deceleration.

16. An anti-skid brake control system of a vehicle comprising:

a wheel speed sensor for sensing a wheel rotation speed, a hydraulic pressure adjusting device for adjusting a brake pressure, and an anti-skid brake controller for controlling the hydraulic pressure adjusting device based on the wheel rotation speed detected so that the brake pressure is cyclically changed in accordance with a control cycle including at least a pressure reduction phase, in which the brake pressure is reduced, and a pressure increase phase, in which the brake pressure is increased, wherein a first brake pressure reducing action is executed with a predetermined amount when the pressure reduction phase of a first control cycle starts after an anti-skid brake control is initiated and a second brake pressure reducing action is executed following the first brake pressure reducing action with an amount which is calculated based on a wheel operation parameter at an end of the first brake pressure reducing action and the amount in the second brake pressure reducing action is increased when a frictional coefficient of a road on which the vehicle is running is greater than a predetermined value.

* * * * *